Dec. 8, 1959  H. L. PENBERTHY  2,916,625
DOSIMETER
Filed March 9, 1955

INVENTOR
HARVEY L. PENBERTHY

BY *Strauch, Nolan & Diggins*

ATTORNEYS

United States Patent Office 2,916,625
Patented Dec. 8, 1959

2,916,625

DOSIMETER

Harvey L. Penberthy, Seattle, Wash.

Application March 9, 1955, Serial No. 493,208

6 Claims. (Cl. 250—83)

This invention relates to a device for indicating the dosage of gamma radiation to which it has been exposed and more particularly relates to a small portable dosimeter for indicating the intensity of radiation from nuclear explosions.

It has become evident from the diagnoses of victims of nuclear radiation that large scale treatment of casualties may be greatly facilitated if all personnel likely to be exposed are provided with some means cable of recording the intensity of individual radiation exposures. Although the symptoms of radiation sickness per se are clear enough that victims may be broadly grouped according to exposure levels, complications introduced by flash burns and blast damage make it impossible to diagnose gamma radiation damage apart from other injuries. It is imperative therefore, that if proper medical treatment is to be applied on a large scale, some means must be available which is capable of independently measuring the radiation dose received by the victims.

Numerous dosimeters have been provided based upon the radiation sensitive photographic film. These units, however, must be developed or processed subsequent to exposure and are useless after the initial exposure.

Other dosimeters have been provided based upon the colorimeter principle utilizing a translucent sensitive element such as crystals of alkali metal halides which have been treated to produce therein a substantial proportion of U-centers to indicate dosage by comparison of the color of the sensitive element with color charts.

Still other dosimeters have been proposed utilizing certain phosphor materials which are permanently affected by radiation so that the effect can be detected at any later time by exposure to ultra-violet radiation. All of the devices of this nature known to me have comprised small slabs of phosphor material mounted upon and partially within plastic cases wherein the determination of dosage was accomplished by subjecting the exposed surface of the phosphor material to ultra-violet radiation while focusing the orange light emitted from the edge of the material through a lens onto a photocell for a quantitative reading. A black mask is provided at the interface between the phosphor material and the plastic backing and care taken to insure that no extraneous materials, such as oils which would modify the luminescence, are present. The casing thus does not enter positively into the production of the orange light, but does control such light to a certain extent in a negative manner in that a poor interface can render the reading of little value.

According to the present invention there is provided an extremely simple phosphor material dosimeter which may be manufactured without any separate bonding operation and wherein the dosimeter casing or container positively cooperates to control the amount of orange light emitted by the dosimeter. These dosimeters comprise a small metal tube which contains the phosphor material. The device is subsequently irradiated by directing a beam of ultra-violet light through the tube and the phosphor material therein so that the fluorescence emanating from the other end may impinge directly upon a photoelectric device or be read directly to provide a quantitative reading.

It is accordingly an object of the present invention to provide a luminescent type of radiation dosimeter which is inexpensive, simple in construction and capable of extreme accuracy.

It is another object of the present invention to provide a luminescent type of dosimeter which may be irradiated with ultra-violet energy by means of relatively simple equipment.

It is another object of the present invention to provide a luminescent type dosimeter wherein the casing cooperates to direct the luminescence due to ultra-violet irradiation in the desired direction.

It is another object of the present invention to provide a dosimeter which is so shaped as to provide a maximum utilization both of the ultra-violet and orange light.

It is another object of the present invention to provide a dosimeter which utilizes a case that can be produced at low cost.

It is a still further object of the present invention to provide a novel method for making a dosimeter of the foregoing type.

Other objects and advantages of the invention will become apparent upon reference to the following specification and claims and appended drawings wherein:

Figure 1:
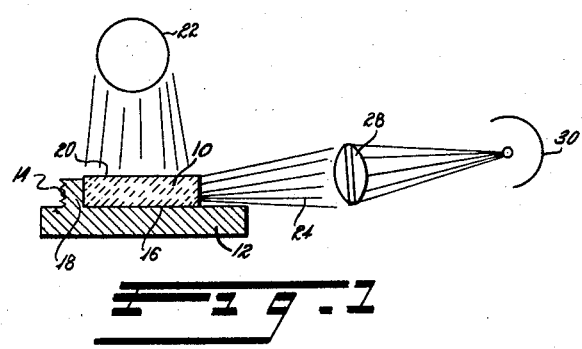
Figure 1 shows a cross section of a luminescent type dosimeter constructed according to the prior art being irradiated by ultra-violet light.

Referring to Figure 1, prior dosimeters of which I am aware have been constructed of a slab of phosphor material 10 having six ground or cut faces and being cemented or otherwise secured to a plastic base 12 in the form of a disc having a raised and threaded ridge 14 partially encircling the slab 10 to provide for mounting a closure cap, not shown. The interfaces 16 and 18 between the slab and the base 12 are blackened and care must be exercised during manufacture to prevent the inclusion of extraneous matter which might itself luminesce under ultra-violet light. In order to determine the dosage of radiation to which the dosimeter has been subjected its upper face 20 is subjected to radiation from an ultra-violet source 22 to cause the slab to fluoresce. The visible fluorescence 24 emanating from the edge 26 of the slab is concentrated by means of a suitable lens 28 and caused to impinge upon a photoelectric device 30 in order to provide a quantitative reading. The manufacture of such devices when compared to manufacture of the dosimeter of this invention, is relatively pains-taking, in that all six faces of the phosphor slab have to be ground or cut and great care has to be taken in joining the slab to the plastic base. Impurities, such as oil, inadvertently included in the interfaces between the slab and the base causes inaccuracies in the indicated dosage. Because of the blackened interfaces between the slab and container there is no reflection at these surfaces unless the orange light strikes the interface at an angle greater than the critical angle, and consequently the interfaces do not substantially aid in directing the orange light in the desired direction.

Figure 2:
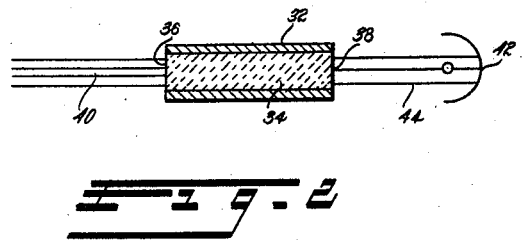
Figure 2 shows a cross section of a luminescent type dosimeter constructed according to one embodiment of this invention being irradiated by ultra-violet light.

Referring to Figure 2 there is shown a vertical cross section of a dosimeter constructed according to one embodiment of this invention which comprises simply a metal tube 32 of any suitable metal, such as aluminum, brass, steel, lead, etc., or alloys thereof, which contains a pencil of phosphor material 34 which may be poured in a molten form into the tube 32. The exposed edges 36 and 38 may be ground, polished, left fire polished as cast, or molded flat while still hot and plastic.

The phosphor or special material used in this dosimeter is a solidified solution consisting of a host material (solvent) and an activator (solute). The preferred activator is a salt of silver, e.g., silver chloride, or more specifically, the silver ion $Ag^+$. The host material may either be a salt, in which case a true "solid solution" (mixed crystal) is formed, or a "glass" in which case the solution is a highly viscous "solidified" liquid. Specific examples of host materials include sodium chloride, sodium bromide, potassium chloride, sodium sulphide, barium chloride and (aluminum phosphate) glass.

The aluminum phosphate glass is the preferred phosphor and a glass of the following composition has been found satisfactory:

50 parts aluminum phosphate
25 parts barium phosphate
25 parts potassium phosphate
8 parts silver phosphate According to the invention the dosimeter may be manufactured by preparing a molten mass of the phosphor material, preferably in the form of a silver glass, and simply pouring this into the metal tube 32. No bonding is necessary and only reasonable precautions need be taken to insure an impurity free interface between the silver glass pencil 34 and the metal cylinder 32. The ends of the dosimeter 36 and 38 may subsequently be ground, polished or molded to complete the manufacturing process. As an alternative to the foregoing method the glass may be manufactured in "cane" form, i.e., in long rods, and subsequently broken off or sawed and mounted in tubes.

The dosimeter is read by directing a beam 40 of utlra-violet light at one face 36 and actuating a photoelectric device 42 by means of the visible orange light 44 which emanates from the other face 38. The diameter of the beam 40 is preferably smaller than the diameter of the silver glass pencil 34 thereby insuring that the condition of the interface between the glass pencil and the metal tube will have a minimum effect upon the reading produced by the photoelectric device 42. Since the metal surface facing the pencil of luminescent material is reflective, any ultra-violet which strikes the interface is reflected back into the luminescent material to increase the amount of orange radiation which may be obtained for any given gamma irradiation.

Figure 3:
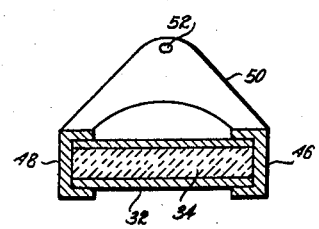
Figure 3 shows the luminescent type dosimeter of Figure 2 with caps which protect its exposed faces.

In order to provide the dosimeter in a form which may be easily carried about by an individual for recording and measuring the radiation to which it has been exposed, the metal tube 32 and silver glass pencil 34 which is integral therewith are provided with a pair of caps 46 and 48 as may be seen in Figure 3. These caps are preferably connected together and may be made integral with a flexible bridge 50 having an eyelet 52 in the upper portion thereof. The cap and bridge assembly may be formed of any suitable material such as, for instance, polyethylene plastic.

Figure 4:
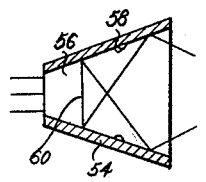
Figure 4 shows a cross section of a luminescent type dosimeter constructed according to another embodiment of this invention.

Referring to Figure 4 of the drawings there is shown another embodiment of the invention wherein a metal tube 54 in the shape of a truncated cone contains a truncated cone of fluorescent material 56. The interior wall of the tube 54 is provided with one or more irregularities 58 which serve as locks to prevent the molded fluorescent material from slipping out. The tubes of this embodiment of the invention may be very inexpensively manufactured by a die-casting process and permit of easy removal of the fluorescent material. The tube serves as a reflector at the fluorescent material interfaces, and because of its shape provides even more output than the cylindrical tubes of Figures 1 through 3. Thus considering a point source of orange light 60, it will be seen that rays which would strike a cylindrical tube at a 90 degree angle and thus never escape are reflected out to increase the orange light output.

In each of the foregoing embodiments of the invention the casing or container has provided a reflective interface which materially increases the orange light output. Because of this it is possible to read these dosimeters in a dark room without the necessity of a photoelectric reading device. Although such a device may be utilized where desired the dosimeters are self reading at least to a certain extent.

It will of course be clear to those skilled in the art that conventional response modifiers may be utilzed with the dosimeters of this invention. To this end it may be desirable to enclose the dosimeter tubes in lead sheaths, which may or may not be perforated, to further modify the response characteristics. Similarly lead washers, solid or perforated, may be utilized in the caps 46 and 48 shown in Figure 3. Other modifications are also possible and the invention also contemplates the manufacture of extremely low cost dosimeters which comprise simply a tube of silver glass or other fluorescent material wrapped in tape.

It will be seen from the foregoing that there has been provided an extremely simple radiation dosimeter capable of low cost manufacture by a simple process and by means of which highly accurate readings of radiation dosage may be obtained. The dosimeter need not be discarded after an initial irradiation but may merely have the intensity of luminescence under ultra-violet light recorded thereon so that subsequent readings may utilize this level as a zero adjustment.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. A dosimeter comprising a container having enclosed sides and an open top and an opposite open bottom, and a solid solution of a silver salt filling said container from said open top to said open bottom and forming a rectilinear light path extending rectilinearly from said open top to said open bottom.

2. A dosimeter comprising a hollow tube having opposite open ends and a solid solution of a silver salt molded in said tube and extending between said opposite open ends and forming a rectilinear light path extending rectilinearly between said opposite open ends.

3. A dosimeter comprising a hollow metal tube having opposite open ends and a solid solution of a silver salt mounted in said tube and extending between said open ends to form a rectilinear light path between said opposite open ends.

4. A dosimeter comprising a hollow metal right circular cylindrical tube having opposite open ends, and a solid solution of a silver salt mounted in said tube and extending between said open ends to form a rectilinear light path between said opposite open ends.

5. A dosimeter comprising a hollow metal tube having a reflective inner surface and being in the shape of a truncated cone having opposite open ends and a solid solution of a silver salt mounted in said tube and extending between said opposite open ends to form a rectilinear light path between said opposite open ends.

6. A dosimeter comprising a hollow metal tube having opposite open ends, a solid solution of a silver salt mounted in said tube between said open ends and forming a rectilinear light path extending between said opposite open ends, removable caps covering said opposite open ends of said tube, and a bridge connecting said caps.

References Cited in the file of this patent

UNITED STATES PATENTS

| | | |
|---|---|---|
| 2,616,051 | Daniels | Oct. 28, 1952 |
| 2,650,309 | Webb et al. | Aug. 25, 1953 |
| 2,673,934 | Friedman | Mar. 30, 1954 |
| 2,689,308 | Land | Sept. 14, 1954 |
| 2,730,625 | Shurcliff | Jan. 10, 1956 |
| 2,738,430 | Schulman et al. | Mar. 13, 1956 |
| 2,750,515 | Shurcliff | June 12, 1956 |